(12) United States Patent
Ozaki et al.

(10) Patent No.: US 10,334,709 B2
(45) Date of Patent: Jun. 25, 2019

(54) LIGHTING SYSTEM

(71) Applicant: PANASONIC INTELLECTUAL PROPERTY MANAGEMENT CO., LTD., Osaka (JP)

(72) Inventors: Hajime Ozaki, Osaka (JP); Tatsumi Setomoto, Osaka (JP); Tamotsu Ando, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/151,922

(22) Filed: Oct. 4, 2018

(65) Prior Publication Data

US 2019/0110352 A1   Apr. 11, 2019

(30) Foreign Application Priority Data

Oct. 11, 2017   (JP) ................................. 2017-197846

(51) Int. Cl.
   *G08C 17/02*   (2006.01)
   *H05B 37/02*   (2006.01)
   *H05B 37/03*   (2006.01)
(52) U.S. Cl.
   CPC ......... *H05B 37/0272* (2013.01); *H05B 37/03* (2013.01)

(58) Field of Classification Search
   CPC ...... H04Q 9/00; G08C 17/02; G08C 2201/93; H04W 4/80; H04L 2012/2841
   See application file for complete search history.

(56) References Cited

U.S. PATENT DOCUMENTS

2019/0013960 A1*   1/2019   Sadwick ............... G08C 23/04

FOREIGN PATENT DOCUMENTS

JP   2007-200715 A   8/2007
JP   2009-252728 A   10/2009

* cited by examiner

*Primary Examiner* — Tung X Le
*Assistant Examiner* — Henry Luong
(74) *Attorney, Agent, or Firm* — McDermott Will & Emery LLP (57) ABSTRACT

A lighting system includes a first luminaire and a second luminaire which are arranged in an illumination area, and a controller. The first luminaire is connected to a first receiver which receives a signal from a transmission tag, and has a first lighting lamp. The second luminaire is connected to a second receiver which receives a signal from the transmission tag, and has a second lighting lamp. The controller turns on the first lighting lamp when the first receiver receives the signal from the transmission tag, then, turns on the second lighting lamp when the second receiver receives the signal from the transmission tag, and notifies that an abnormal situation has occurred when no signal from the transmission tag is received by the first receiver within a predetermined time period from the turning on of the second lighting lamp.

10 Claims, 10 Drawing Sheets

LIGHTING SYSTEM

CROSS REFERENCE TO RELATED APPLICATION

The entire disclosure of Japanese Patent Application No. 2017-197846 filed on Oct. 11, 2017, including the specification, claims, drawings, and abstract is incorporated herein by reference in its entirety.

BACKGROUND

Technical Field

The present disclosure generally relates to a lighting system and a control facility.

Related Art

There has been conventionally proposed a lighting device for saving energy by illuminating only a place where a person is present in a building of a control facility such as a nursing care facility, a hospital, or a warehouse, which requires the control of a person or an object. On the other hand, Japanese Unexamined Patent Application No. 2007-200715 A discloses that a plurality of information reading devices read user information stored in an IC tag which is an information storage unit carried by a user, and control a luminaire in accordance with the information. This user information includes user's parameters and a user's position. When the current position of the user changes, the information reading device for reading the user information is switched to another information reading device, and the control contents of the luminaire are changed.

Also, Japanese Unexamined Patent Application No. 2009-252728 A discloses that a human detection unit is comprised of a transmitter (transmitting unit) carried by a person and a plurality of receivers, a movement destination of the person is predicted based on the information of the human detection unit and by a position prediction unit, and a command is output to the corresponding luminaires based on the predicted result to turn on the luminaires. As disclosed in Japanese Unexamined Patent Application No. 2009-252728 A, when the person moves to a position far away from a predetermined area, the luminaires in the predetermined area are turned off.

In the configurations disclosed in Japanese Unexamined Patent Application No. 2007-200715 A and Japanese Unexamined Patent Application No. 2009-252728 A, when the person carrying the transmitting unit stays at the movement destination for a long time due to the occurrence of an abnormal situation such as ill health, there is a possibility that another person distant from the movement destination cannot be aware of such an occurrence of an abnormal situation. When an employee carrying the transmitting unit is in a room with high confidentiality for a long time, an administrator may desire to recognize the room situation. Therefore, it is desired to provide the lighting system and the control facility which are configured so that another person easily recognizes that a person carrying a transmission tag, being a transmitting unit, stays at the movement destination for a long time.

SUMMARY

A lighting system according to one aspect of the present disclosure includes a first luminaire and a second luminaire, which are arranged in an illumination area; a controller which controls the first luminaire and the second luminaire, and a transmission tag, wherein: the first luminaire includes a first lighting lamp and is connected to a first receiver which receives a signal from the transmission tag through the controller, the second luminaire includes a second lighting lamp and is connected to a second receiver which receives a signal from the transmission tag through the controller, and the controller turns on the first lighting lamp when the first receiver receives the signal from the transmission tag, then, turns on the second lighting lamp when the second receiver receives the signal from the transmission tag, and notifies that an abnormal situation has occurred when no signal from the transmission tag is received by the first receiver within a predetermined time period from the turning on of the second lighting lamp. A control facility according to one aspect of the present disclosure includes a control room including an alarm unit having a display; and one or more lighting systems, each which is the lighting system according to one aspect of the present disclosure.

According to the lighting system and the control facility according to one aspect of the present disclosure, another person can easily recognize that a person carrying the transmission tag stays at a movement destination for a long time.

BRIEF DESCRIPTION OF DRAWINGS

The figures depict one or more implementations in accordance with the present teaching, by way of example only, not by way of limitations. In the figures, like reference numerals refer to the same or similar elements.

Embodiments of the present disclosure will be described based on the following figures, wherein.

DESCRIPTION OF EMBODIMENTS

Hereinafter, embodiments of a lighting system according to the present disclosure will be described in detail with reference to the accompanying drawings. Furthermore, in the case where a plurality of embodiments and variations are provided below, it is originally intended that some features of the embodiments and variations are appropriately combined. The shapes and the number described below are illustrative, and can be appropriately changed according to the use of the lighting system. Hereinafter, in all the drawings, like components are denoted by the same reference numerals.

Figure 1:
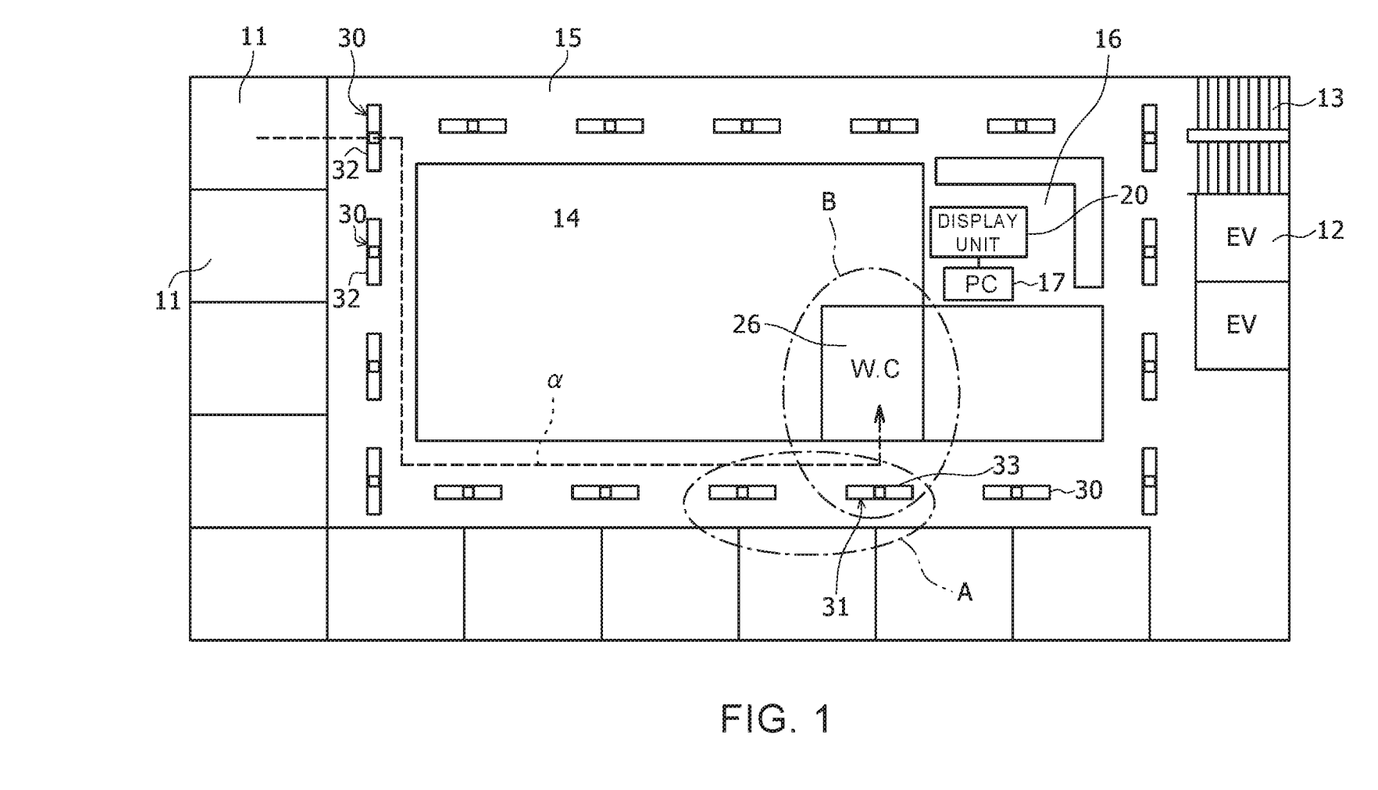
FIG. 1 is a top plan view illustrating a control facility provided with a lighting system of one example of an embodiment.

FIG. 1 is a top plan view illustrating a control facility provided with a lighting system of one example of an embodiment. First, the control facility will be described. Examples of the control facility include a nursing care facility such as a nursing home, and a long-term health care facility. In such a control facility, the control of the condition of a care receiver may be required to enhance the safety of the care receiver.

FIG. 1 illustrates one residence floor of the control facility. The residence floor has a plurality of living rooms 11 for care receivers to live in. The plurality of living rooms 11 are arranged in an L shape as viewed from the top. Elevators (EV) 12 and stairs 13 are also arranged in the residence floor. A corridor 15 having a substantially rectangular shape is arranged on the residence floor so as to surround a central space 14, as viewed from the top.

On the residence floor, a control room 16 such as an office for an administrator to perform jobs such as control processing is arranged at a position facing the elevators 12 with the corridor 15 interposed therebetween. In the control room 16, a host PC (host personal computer) 17 serving as the controller and a display unit 20 such as a display which is connected to the host PC 17 are arranged.

Figure 5:
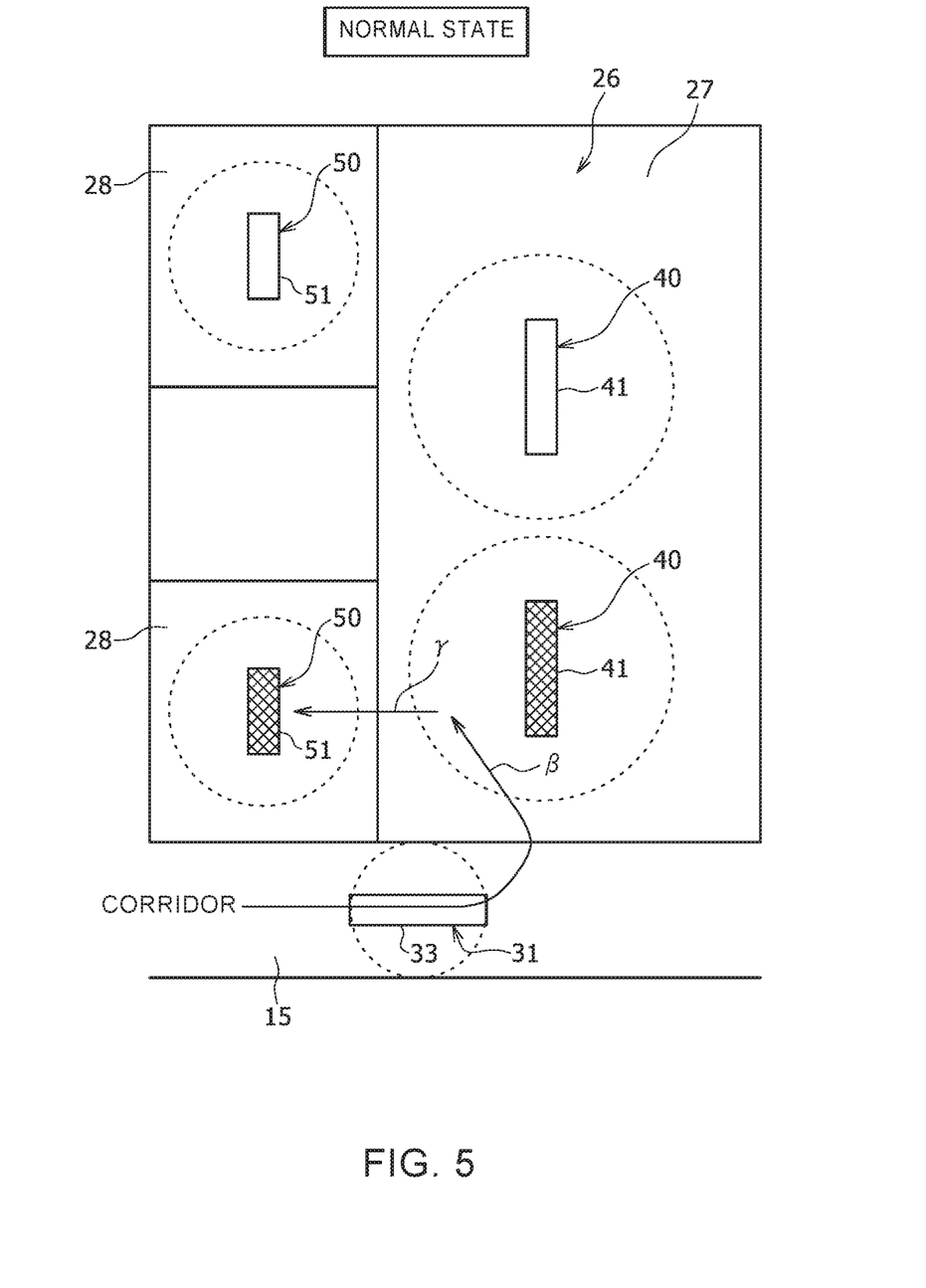
FIG. 5 is an enlarged view of an area B of FIG. 1 illustrating a normal state when a user having a transmission tag moves from a corridor to a private washroom in a rest room.
Figure 6:
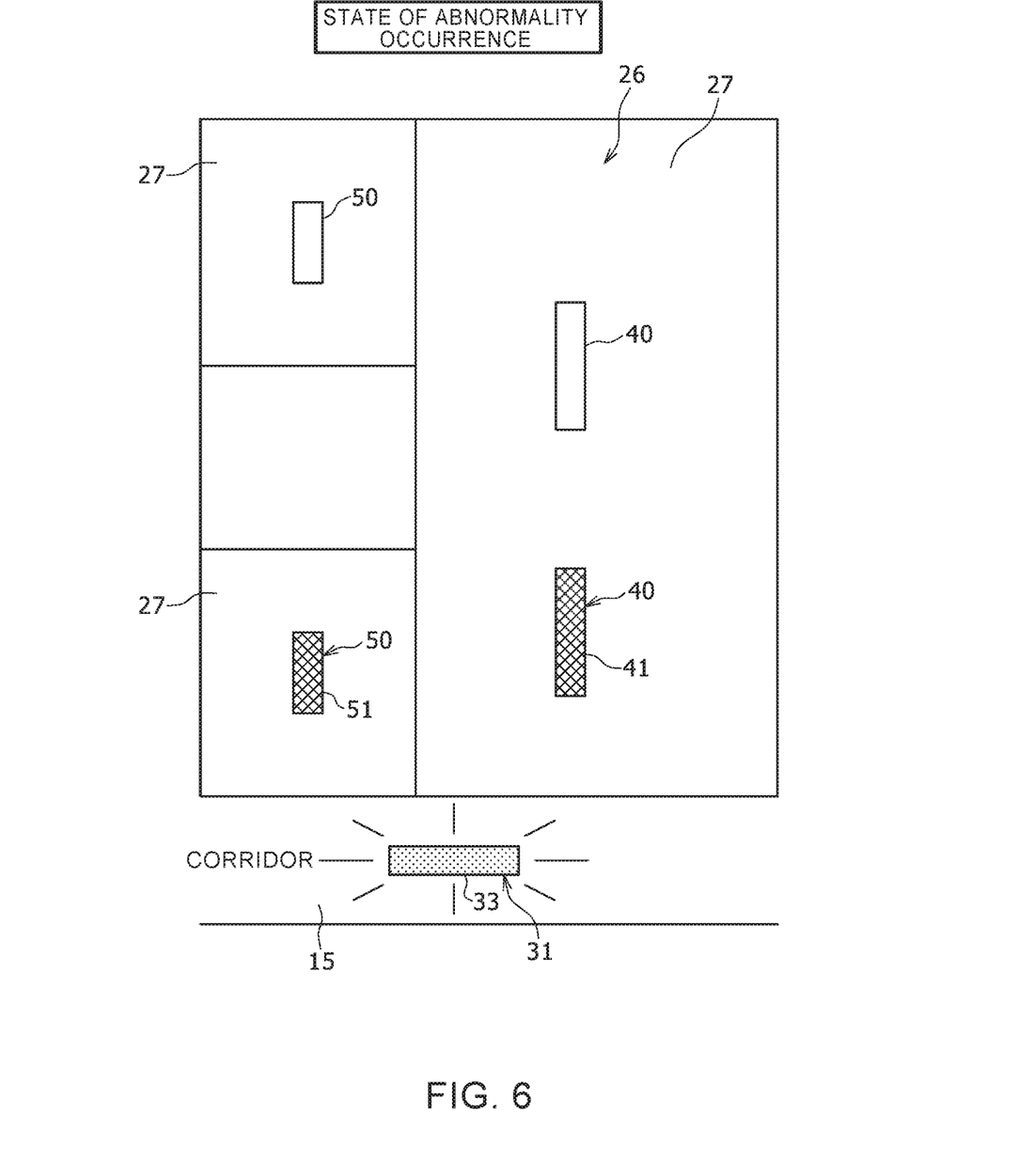
FIG. 6 is an enlarged view of the area B of FIG. 1 illustrating an abnormal situation state when the user having the transmission tag moves from the corridor to the private washroom in the rest room.

On the residence floor, a rest room 26 is arranged at a position facing a part of the corridor 15. As illustrated in FIG. 5 and FIG. 6, which are described later, the rest room 26 includes a passage space 27 in which a lavatory (not illustrated) is installed, and a plurality of private washrooms 28 each of which face the passage space 27 and in which a stool (not illustrated) is arranged. In FIG. 1, a dashed-line arrow α indicates a movement path of the care receiver from the living room 11 located at a corner of the residence floor to the rest room 26. Furthermore, a plurality of first lighting devices 30 and 31 are arranged side by side in a plurality of positions in a circumferential direction of a ceiling portion of the corridor 15. As illustrated in FIG. 5 and FIG. 6, which are described later, a plurality of intermediate lighting devices 40 and a plurality of second lighting devices 50 are arranged in the rest room 26. In the embodiment, the corridor 15 and the rest room 26 become the illumination area.

Figure 2:
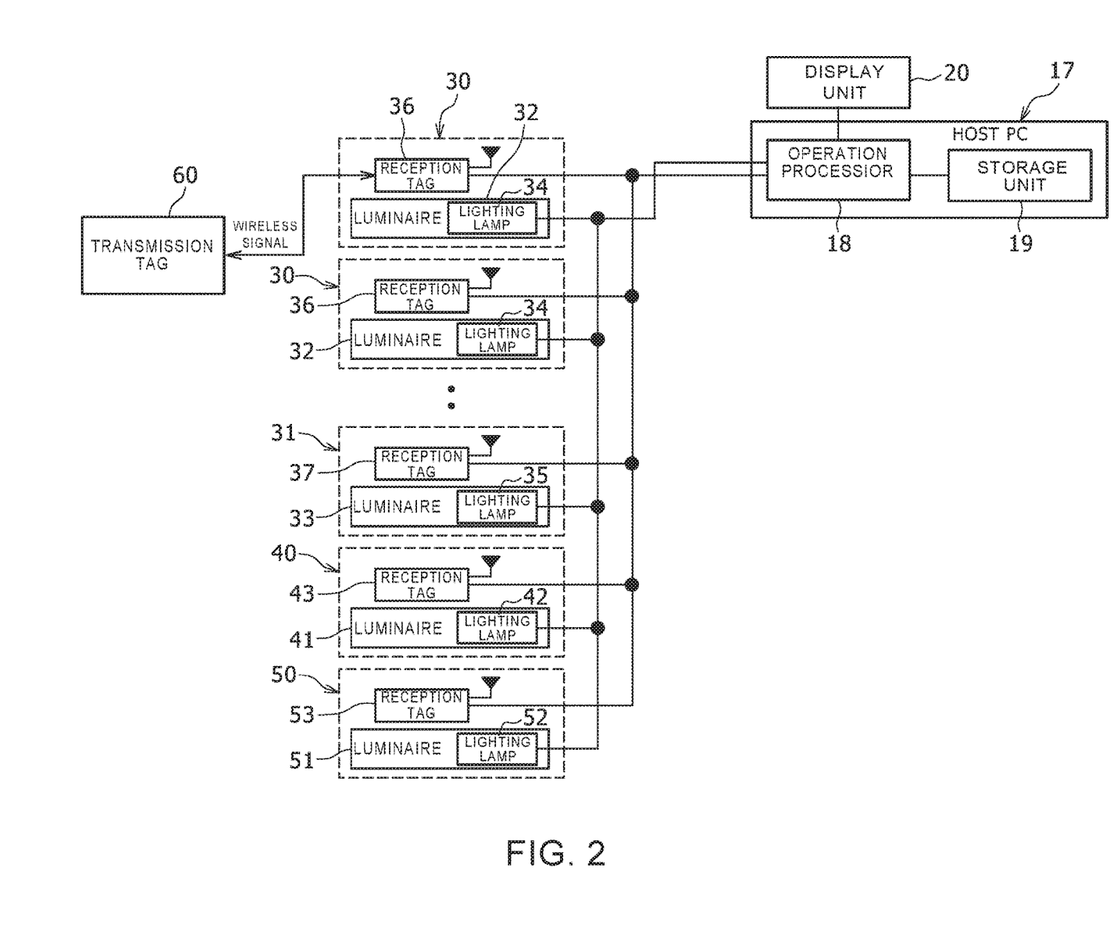
FIG. 2 is a configuration diagram illustrating the lighting system of one example of the embodiment.
Figure 3:
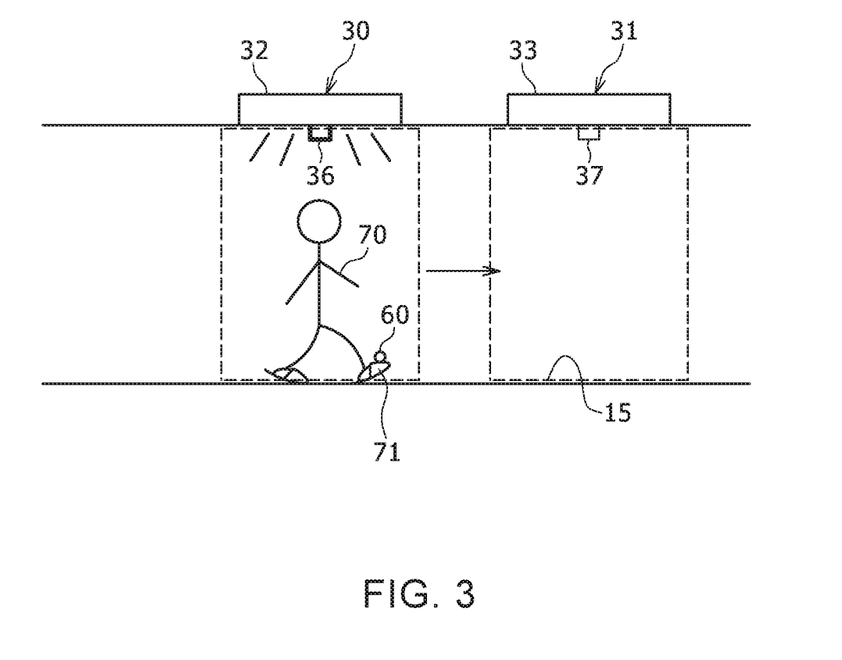
FIG. 3 is a diagram illustrating an area A of FIG. 1 when viewed in a transverse direction.

FIG. 2 is a configuration diagram illustrating the lighting system of one example of the embodiment. FIG. 3 is a diagram illustrating an area A of FIG. 1 when viewed in the transverse direction. The lighting system includes the plurality of first lighting devices 30 and 31 which are arranged in the illumination area, the two intermediate lighting devices 40, the two second lighting devices 50, a host PC 17 and the transmission tag 60. The plurality of first lighting devices 30 and 31 are arranged on the ceiling portion of the corridor 15 illustrated in FIG. 1. The two intermediate lighting devices 40 are arranged on the ceiling portion of the passage space 27 in the rest room 26, as illustrated in FIG. 5 and FIG. 6 which are described later. The two second lighting devices 50 are similarly arranged on the respective ceiling portions of the two private washrooms 28 in the rest room 26.

The first lighting devices 30 and 31 include the first luminaires 32 and 33 having the first lighting lamps 34, 35 (FIG. 2), and first reception tags 36 and 37 serving as first receivers, respectively. The first luminaires 32 and 33 are controlled by the host PC 17, which will be described later. The first reception tags 36 and 37 receive a wireless signal from the transmission tag 60. The transmission tag 60 is carried by each of the users 70 (FIG. 3) who are care receivers. The first reception tags 36, 37 are connected to the first luminaires 32 and 33 through the host PC 17, respectively.

The intermediate lighting device 40 includes an intermediate luminaire 41 having an intermediate lighting lamp 42, and an intermediate reception tag 43 serving as an intermediate receiver. The intermediate luminaire 41 is controlled by the host PC 17. The intermediate reception tag 43 receives a wireless signal from the transmission tag 60. The intermediate reception tag 43 is connected to the intermediate luminaire 41 through the host PC 17.

The second lighting device 50 includes a second luminaire 51 having a second lighting lamp 52, and a second reception tag 53 serving as a second receiver. The second luminaire 51 is controlled by the host PC 17. The second reception tag 53 receives a wireless signal from the transmission tag 60. The second reception tag 53 is connected to the second luminaire 51 through the host PC 17.

The IP addresses are individually set for the above-described luminaires 32, 33, 41, and 51, so that the host PC 17 described later can identify the luminaires 32, 33, 41, and 51.

The transmission tag 60 is an RF tag, and transmits the wireless signal. The transmission tag 60 is carried by a user 70 (FIG. 3), for example. As illustrated in FIG. 3, for example, the transmission tag 60 is attached to one of a pair of slippers that the user 70 is wearing. Note that the transmission tag 60 may be incorporated in a cellular phone carried by the user 70. Alternatively, the transmission tag 60 may be attached to a garment that the user is wearing. Since the transmission tag 60 records tag identification information therein to hold the tag identification information, the wireless signal to be transmitted by the transmission tag 60 includes the tag identification information. The tag identification information is used to identify the transmission tag 60.

Figure 4:
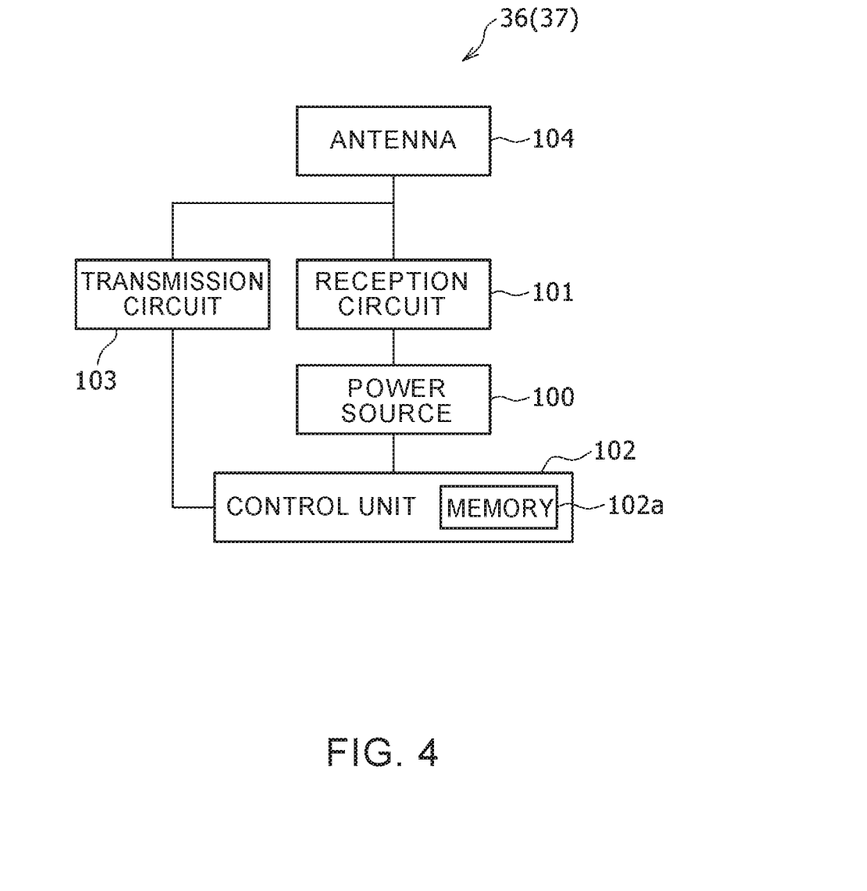
FIG. 4 is a configuration diagram of a first reception tag in one example of the embodiment.

FIG. 4 is a configuration diagram of the first reception tags 36 and 37 in one example of the embodiment. The first reception tags 36 and 37 each include a reception circuit 101 and a controller 102 which are connected to a power source 100, a transmission circuit 103 which is connected to the controller 102, and an antenna 103 which is connected to the transmission circuit 103 and the reception circuit 101. The controller 102 includes an operation processor (not illustrated), a memory 102a which is connected to the operation processor, and a microcomputer having an I/O interface (not illustrated). The intermediate reception tag 43 and the second reception tag 53 have the same configuration as the first reception tags 36 and 37.

The receiver of each of the reception tags 36, 37, 43, and 53 receives the wireless signal from the transmission tag 60 when the transmission tag 60 enters the receivable range.

Areas enclosed by dashed lines in FIG. 3 schematically represent the receivable ranges capable of receiving the signal from the transmission tag 60 (FIG. 2) by the first reception tags 36 and 37 in the first lighting devices 30 and 31, respectively. In FIG. 5, which is described later, areas encircled by the dashed lines schematically represent the receivable ranges of the reception tags for the first lighting device 31 in front of the rest room, the intermediate lighting devices 40, and the second lighting devices 50, respectively. The receivable ranges of the reception tags for the plurality of lighting devices 30, 31, 40 and 50 do not overlap one another.

As illustrated in FIG. 2, the host PC 17 includes an operation processor 18, a storage unit 19 such as a memory which is connected to the operation processor 18, the I/O interface (not illustrated), and the like, and the display unit 20 such as a display is connected to the operation processor 18. The host PC 17 reads out a program, data, or the like which are stored in the storage unit 19, to perform a predetermined operation. The main functions of the device, system or method in the present disclosure are achieved when the host PC 17 executes the program. The host PC 17 includes the operation processor 18 which operates in accordance with the program, as a main hardware configuration. The type of the operation processor 18 is not limited as long as the operation processor 18 can achieve the functions by executing the program. The operation processor 18 is structured by one or plural electronic circuits including a semiconductor integrated circuit (IC) or an LSI (large scale integration). The plural electronic circuits may be integrated into one chip, or may be provided on plural chips. The plural chips may be integrated into one device, or may be provided on the plural devices. The storage unit 19 is, for example, a ROM readable by the operation processor 18. A non-temporal recording medium such as an optical disk, or a hard disk drive may be used as the storage unit 19. An external storage device serving as the storage unit 19 may be connected to the host PC 17. The program may be previously stored in the recording medium, or may be supplied to the recording medium through an extensive communication network such as the internet.

In FIG. 2, the reception tags 36, 37, 43, and 53 which are included in the first lighting devices 30 and 31, the intermediate lighting device 40, and the second lighting device 50, respectively, are connected to the host PC 17 by wired cables. The luminaires 32, 33, 41, and 51 are connected to the host PC 17 by wired cables. On the other hand, in the first lighting devices 30 and 31, the intermediate lighting device 40, and the second lighting device 50, the reception tags 36, 37, 43, and 53 are wirelessly connected to the host PC 17, and the luminaires 32, 33, 41, and 51 are wirelessly connected to the host PC 17.

The host PC 17 controls the turned-on state of the plurality of first luminaires 32 and 33 which are arranged on the ceiling portion of the corridor 15 except for the first luminaire 33 which is arranged on the ceiling portion in front of the rest room 26 by a "first process." On the other hand, the host PC 17 controls the turned-on state of the first luminaire 33 in front of the rest room 26, the intermediate luminaire 41 and the second luminaire 51 by a "second process."

Hereinafter, the "first process" and the "second process" will be specifically described with reference to FIG. 1, FIG. 5, FIG. 6, and FIGS. 7A to 7C. Referring to FIG. 1 and FIG. 2, when the first reception tag 36 corresponding to any one of the plurality of first luminaires 32 except for the first luminaire 33 in front of the rest room 26 receives a signal from the transmission tag 60, the host PC 17 turns on the corresponding first luminaire 32. When the next first reception tag 36 located near the movement destination to which the user 70 has moved receives the signal from the transmission tag 60, the host PC 17 turns on the first luminaire 32 corresponding to the next first reception tag 36, and turns off the first luminaire 32 which had been turned on previously. The host PC 17 turns on the plurality of the first luminaires 32 one by one along with the movement of the user 70, and turns off the first luminaire 32 which had been turned on previously after the next first luminaire 32 is turned on.

Furthermore, in the first lighting device 31 in front of the rest room 26, when the first reception tag 37 (FIG. 2) corresponding to the first luminaire 33 receives the signal from the transmission tag 60 (FIG. 2), the host PC 17 turns on the first lighting lamp 35 (FIG. 2) of the first luminaire 33. As indicated by an arrow β in FIG. 5, the user 70 (FIG. 3) may move from the corridor 15 to the passage space 27 in the rest room 26. In this case, in the intermediate lighting devices 40 located on the ceiling portion of the passage space 27, when the intermediate reception tag 43 (FIG. 2) corresponding to the intermediate luminaire 41 receives the signal from the transmission tag 60, the host PC 17 turns on the intermediate lighting lamp 42 (FIG. 2) of the corresponding intermediate luminaire 41. As indicated by an arrow γ in FIG. 5, the user 70 may move from the passage space 27 to the private washroom 28. In this case, in the second lighting devices 50 located on the ceiling portion of the private washrooms 28, when the second reception tag 53 (FIG. 2) corresponding to the second luminaire 51 receives the signal from the transmission tag 60, the host PC 17 turns on the second lighting lamp 52 (FIG. 2) of the corresponding second luminaire 51. In FIG. 5 and FIG. 6, the intermediate luminaire 41 and the second luminaire 51 represented by rectangles shown by cross-hatching are in the turned-on state. The first luminaire 33, the intermediate luminaire 41 and the second luminaire 51 represented by outlined rectangles are in the turned-off state. On the other hand, when the user 70 does not move due to ill health or the like in the private washroom 28, both of the first reception tag 37 and the intermediate reception tag 43 may not receive the signal from the transmission tag 60 after a predetermined time period has elapsed following the turning on of the second lighting lamp 52 of the second luminaire 51. In this case, the host PC 17 turns on the first luminaire 33 in front of the rest room 26 in a lighting condition different from the normal lighting condition or makes it blink it to notify that the abnormal situation has occurred. In FIG. 6, the first luminaire 33 represented by a rectangle shown by a fine dot pattern is made to blink. A person in the corridor 15 who is aware that the first luminaire 33 in front of the rest room 26 is blinked can recognize that the abnormal situation has occurred in the rest room 26, and can respond promptly to the occurrence of an abnormal situation by rushing to the rest room 26, etc.

Figure 7A:
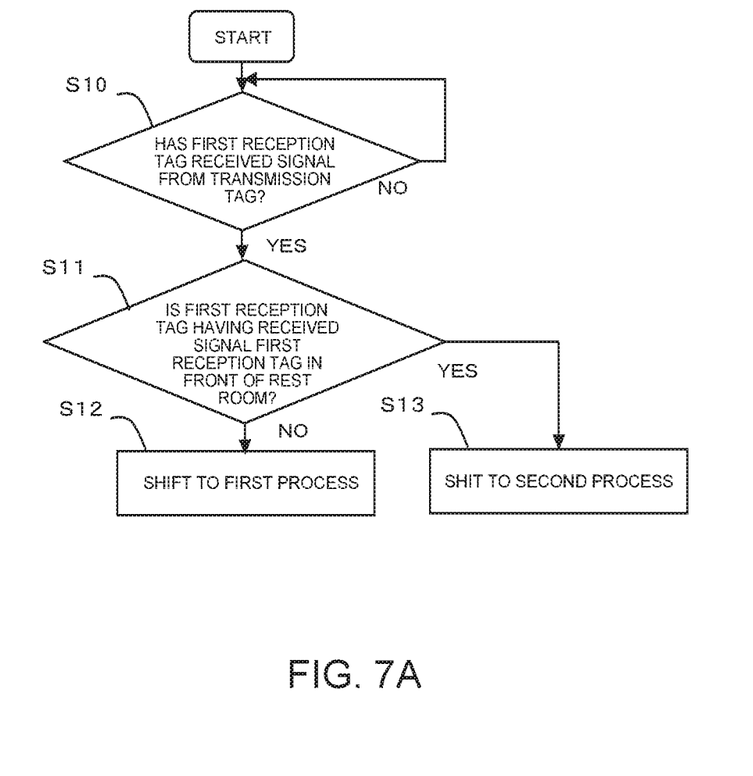
FIG. 7A is a flowchart illustrating a method of shifting to a first process and a second process in a method of controlling first luminaires, intermediate luminaires, and second luminaires, in one example of the embodiment.
Figure 7B:
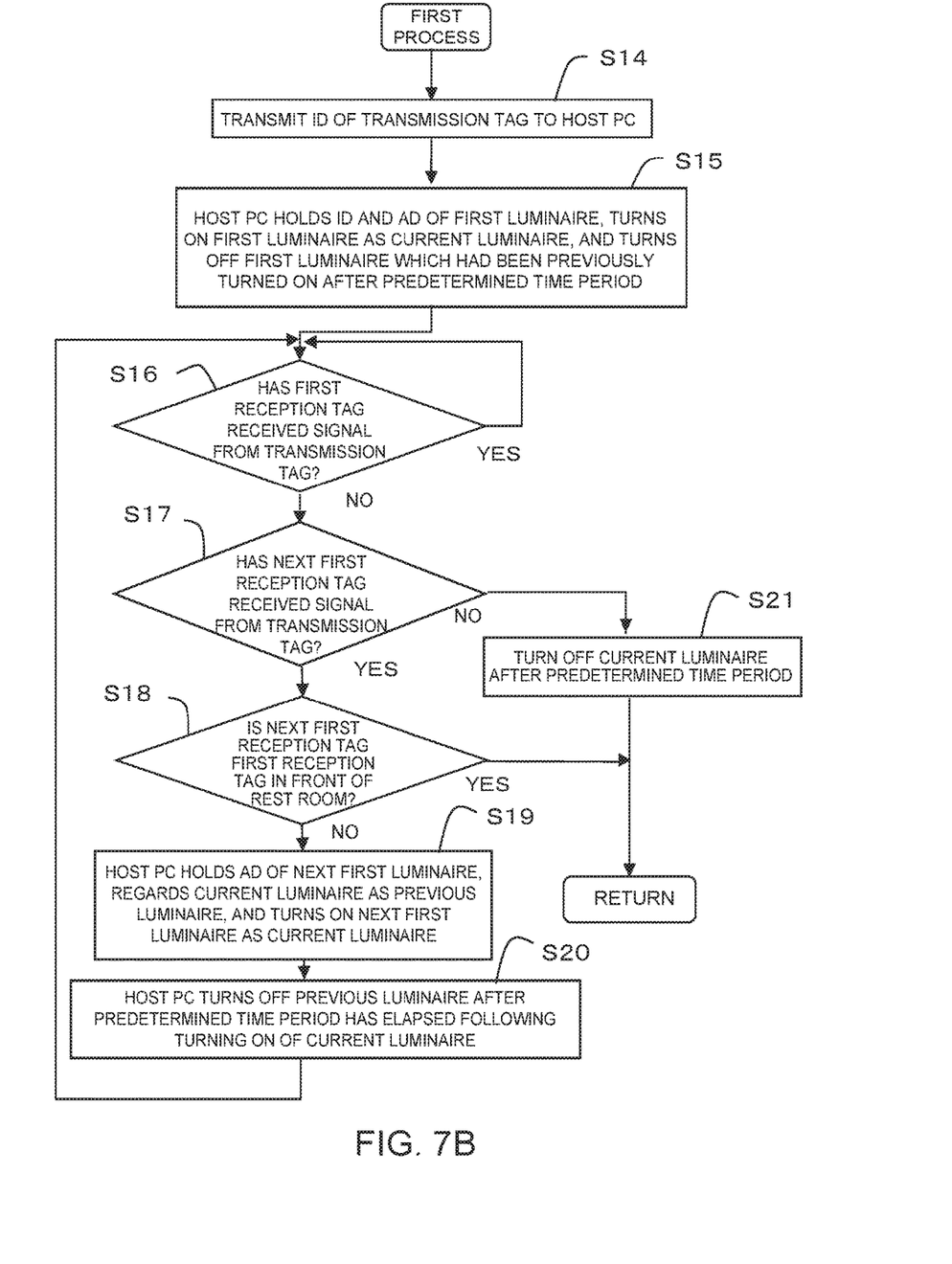
FIG. 7B is a flowchart illustrating the first process of controlling a plurality of first luminaires except for a first luminaire in front of the rest room in one example of the embodiment.
Figure 7C:
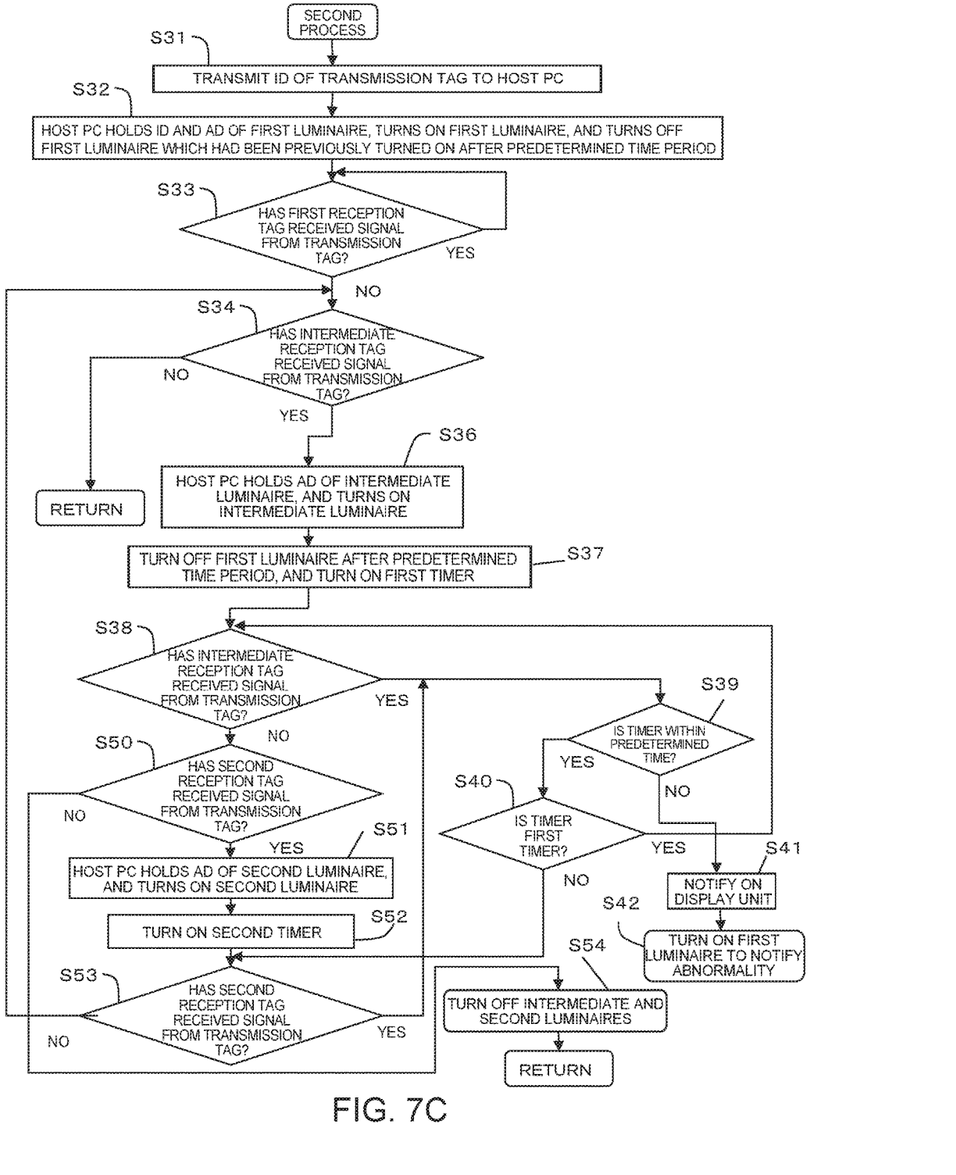
FIG. 7C is a flowchart illustrating the second process of controlling the first luminaire in front of the toilet, the intermediate luminaires and the second luminaires in one example of the embodiment.

A method of controlling the first luminaires 32 and 33, the intermediate luminaires 41, and the second luminaires 51 will be described with reference to FIG. 7A to FIG. 7C. FIG. 7A is a flowchart illustrating a method of shifting to the first process and the second process in the method of controlling the first luminaires 32 and 33, the intermediate luminaires 41, and the second luminaires 51. FIG. 7B is a flowchart illustrating the first process controlling the plurality of first luminaires 32 except for the first luminaire in front of the rest room 26. FIG. 7C is a flowchart illustrating the second process controlling the first luminaire 33 in front of the rest room 26, the intermediate luminaires 41 and the second luminaires 51.

In step S10 in FIG. 7A, the host PC 17 determines whether any one of the plurality of first reception tags 36 and 37 arranged on the ceiling portion of the corridor 15 has received a signal from the transmission tag 60. When the host PC 17 determines that any one of the plurality of first reception tags 36 and 37 has received the signal from the transmission tag 60 (YES in step S10), the process proceeds to step S11. At this time, the user 70 is located in the corridor 15. When the host PC 17 determines that any one of the plurality of first reception tags 36 and 37 has not received the signal from the transmission tag 60 (NO in step S10), the determination procedure is repeated. The information to be transmitted to the first reception tag from the transmission tag 60 includes the tag identification information as described above.

In step S11, the host PC 17 determines whether the first reception tag having received the signal is the first reception tag 37 in front of the rest room 26. When the host PC 17 determines that the first reception tag having received the signal is the first reception tag 36 which is not the first reception tag 37 in front of the rest room 26 (NO in step S11), the process proceeds to step S12, and shifts to the first process illustrated in FIG. 7B.

The first process illustrated in FIG. 7B controls the plurality of first luminaires 32 except for the first luminaire 33 in front of the rest room 26. First, in step S14, the tag identification information (ID) of the transmission tag 60 received by the first reception tag 36 in step S10 is transmitted to the host PC 17. Thus, the host PC 17 can identify the transmission tag 60.

Next, in step S15, the host PC 17 stores and holds the tag identification information and the IP address (AD) of the first luminaire 32 corresponding to the first reception tag 36 which has received the signal of the transmission tag 60 in the storage unit 19 (FIG. 2). The host PC 17 turns on this first luminaire 32 as a "current luminaire," and if the first luminaire 32 or 33 is previously turned on, the host PC 17 turns off the corresponding first luminaire 32 or 33 after a predetermined time period has elapsed following the current turning on of the first luminaire 32. Thus, when the user 70 carrying the transmission tag 60 moves, the first luminaire 32 near the movement destination is turned on, and then the first luminaire 32 or 33 located near the user 70 before the movement is turned off after the predetermined time period has elapsed following the turning on of the first luminaire 32 near the movement destination, thereby making it possible to enhance the user's feeling of safety, and to save energy.

Next, in step S16, when the first reception tag 36 corresponding to the current luminaire is regarded as a current first reception tag, the host PC 17 determines whether the present first reception tag has received the signal from the transmission tag 60. When the host PC 17 determines that the current first reception tag has received the signal from the transmission tag 60 (YES in step S16), the determination procedure is repeated. Thus, the current luminaire is maintained in the turned-on state. On the other hand, when the host PC 17 determines that the current first reception tag has not received the signal from the transmission tag 60 (NO in step S16), the process proceeds to step S17.

In step S17, the host PC 17 determines whether the next first reception tag 36 or 37 which is different from the present first reception tag has received the signal from the transmission tag 60 along with the movement of the user 70, etc. When the host PC 17 determines that the next first reception tag 36 or 37 has received the signal from the transmission tag 60 (YES in step S17), the process proceeds to step S18. On the other hand, when the host PC 17 determines that the next first reception tag 36 or 37 has not received the signal from the transmission tag 60 (NO in step S17), in step S21, the host PC 17 turns off the current luminaire after the predetermined time period has elapsed, and then the process returns to the process in step S10 in FIG. 7A.

In step S18, the host PC 17 determines whether the next first reception tag 36 or 37 is the first reception tag 37 in front of the rest room. When the host PC 17 determines that the next first reception tag 36 or 37 is not the first reception tag 37 in front of the rest room (NO in step S18), the process proceeds to step S19. On the other hand, when the host PC 17 determines that the next first reception tag 36 or 37 is the first reception tag 37 in front of the rest room (YES in step S18), the process returns to the process in step S10 in FIG. 7A.

In step S19, the host PC 17 stores and holds the IP address of the first luminaire 32 corresponding to the next first reception tag 36 in the storage unit 19 (FIG. 2). The host PC 17 changes and sets the "current luminaire" to the "previous luminaire," and then regards the first luminaire 32 corresponding to the next first reception tag 36 as the "current luminaire" and turn on this current luminaire.

Next, in step S20, the host PC 17 turns off the previous luminaire after the predetermined time period has elapsed following the turning on of the current luminaire, and the process returns to step S16. The turning off of the previous luminaire in step S20 is similar to that in step S15. By returning to step S16, the process from step S16 to step S20 is repeatedly performed for the current luminaire with the setting changed.

On the other hand, when returning to step S11 in FIG. 7A, the host PC 17 determines that the first reception tag having received the signal is the first reception tag 37 in front of the rest room (YES in step S11), the process proceeds to step S13. In step S13, the process shifts to the second process illustrated in FIG. 7C.

The second process illustrated in FIG. 7C controls the first luminaire 33 in front of the rest room, and the intermediate luminaires 41 and the second luminaires 51 in the rest room. First, in step S31, the tag identification information (ID) of the transmission tag 60 received by the first reception tag 37 in step S10 is transmitted to the host PC 17.

Next, in step S32, the host PC 17 stores and holds the tag identification information and the IP address (AD) of the first luminaire 33 in front of the rest room in the storage unit 19 (FIG. 2). The host PC 17 turns on the first lighting lamp 35 (FIG. 2) of the first luminaire 33 in front of the rest room, and if the first luminaire 32 is previously turned on, the host PC 17 turns off the corresponding first luminaire 32 after a predetermined time period has elapsed following the turning on of the first luminaire 33 in front of the rest room. Hereinafter, in the description in FIG. 7C, the first luminaire 33 in front of the rest room 26 is simply referred to as the "first luminaire 33," and the first reception tag 37 corresponding to this first luminaire 33 is simply referred to as the "first reception tag 37."

Next, in step S33, the host PC 17 determines whether the first reception tag 37 has received the signal from the transmission tag 60. When the host PC 17 determines that the first reception tag 37 has received the signal from the transmission tag 60 (YES in step S33), the determination procedure is repeated. On the other hand, when the host PC 17 determines that the present first reception tag 37 has not received the signal from the transmission tag 60 (NO in step S33), the process proceeds to step S34.

In step S34, the host PC 17 determines whether the intermediate reception tag 43 (FIG. 2) of the intermediate lighting device 40 in the passage space 27 in the rest room 26 has received the signal from the transmission tag 60. When the host PC 17 determines that the intermediate reception tag 43 has not received the signal from the transmission tag 60 (NO in step S34), the process returns to step S10 in FIG. 7A. On the other hand, when the host PC 17 determines that the intermediate reception tag 43 has received the signal from the transmission tag 60 (YES in step S34), the process proceeds to step S36.

In step S36, the host PC 17 holds the IP address (AD) of the intermediate luminaire 41 in the passage space 27, and turns on the intermediate lighting lamp (FIG. 2) of the intermediate luminaire 41. In the example illustrated in FIG. 5 and FIG. 6, there are two intermediate luminaires 41 on the ceiling portion of the passage space 27, one of the two being arranged on the entrance side of the rest room 26 (lower side of FIG. 5 and FIG. 6), and the other being arranged on the side opposite to the entrance (upper side of FIG. 5 and FIG. 6). Each of the intermediate lighting devices 40 includes the intermediate luminaire 41 and the intermediate reception tag 43 (FIG. 2) which is connected to the intermediate luminaire 41 through the host PC 17 (FIG. 2). In this case, the host PC 17 turns on the intermediate luminaire 41 corresponding to the intermediate reception tag 43 which has received the signal from the transmission tag 60 at the current time, of the two intermediate reception tags 43. Note that when one of the two intermediate reception tags 43 has received the signal from the transmission tag 60, the host PC 17 may turn on both of the two intermediate luminaires 41. In the passage space 27, only one, or three or more intermediate lighting devices may be arranged.

Next, in step S37, the host PC 17 turns off the first luminaire 33 after the predetermined time period has elapsed following the turning on of the intermediate luminaire 41, and turns on a first timer as a time measurement unit. Next, in step S38, the host PC 17 determines whether the intermediate reception tag 43 (FIG. 2) has received the signal from the transmission tag 60. When the host PC determines that the intermediate reception tag 43 (FIG. 2) has received the signal from the transmission tag 60 (YES in step S38), in step S39, the host PC 17 determines whether the time measured by the timer is within a predetermined time period. The timer is the first timer or a second timer, which will be described later. When the host PC 17 determines that the time measured by the timer is within the predetermined time period (YES in step S38), in step S40, the host PC 17 determines whether the timer is the first timer. When the host PC 17 determines that the timer is the first timer (YES in step S40), the process returns to step S38. When the host PC 17 determines in step S40 that the timer is not the first timer but the second timer (NO in step S40), the process proceeds to step S53 which will be described later.

On the other hand, when the host PC 17 determines in step S39 that the time measured by the timer exceeds the predetermined time period (NO in step S39), in step S41, the display unit 20 (FIG. 2) connected to the host PC 17 notifies that the abnormal situation has occurred. Next, in step S42, the host PC 17 makes the first lighting lamp 35 (FIG. 2) of the first luminaire 33 blink, to notify that the abnormal situation has occurred. At this time, the host PC 17 may turn on the first lighting lamp 35 in a lighting condition different from the normal lighting condition using at least one of color and luminance to notify that the abnormal situation has occurred.

Thus, the host PC 17 notifies that the abnormal situation has occurred, when the first reception tag 37 (FIG. 2) does not receive the signal from the transmission tag 60 after a predetermined time period has elapsed following the turning on of the intermediate lighting lamp 42 (FIG. 2).

On the other hand, when returning to step S38, if the host PC 17 determines that the intermediate reception tag 43 (FIG. 2) has not received the signal from the transmission tag 60 (NO in step S38), the process proceeds to step S50. In step S50, the host PC 17 determines whether the second reception tag 53 (FIG. 2) on the ceiling portion of the private washroom 28 in the rest room 26 has received the signal from the transmission tag 60. At this time, as illustrated in FIG. 5 and FIG. 6, the two second lighting devices 50 are arranged on the respective ceiling portions of the two private washrooms 28 in the rest room 26. Each of the second lighting devices 50 includes the second luminaire 51 and the second reception tag 53 which is connected to the second luminaire 51 through the host PC 17. In this case, the host PC 17 determines whether one of the two second reception tags 53 has received the signal from the transmission tag 60. When the host PC 17 determines that the second reception tag 53 has received the signal from the transmission tag 60 (YES in step S50), the process proceeds to step S51.

In step S51, the host PC 17 stores and holds the IP address (AD) of the second luminaire 51 corresponding to the second reception tag 53 which has received the signal from the transmission tag 60 in the storage unit 19 (FIG. 2), and turns on the second lighting lamp 52 (FIG. 2) of this second luminaire 51. Next, in step S52, the host PC 17 turns on a second timer as a time measurement unit.

Next, in step S53, the host PC 17 determines whether the second reception tag 53 has received the signal from the transmission tag 60. When the host PC 17 determines that the second reception tag 53 has received the signal from the transmission tag 60 (YES in step S53), the process returns to step S39. At this time, in step S39, the host PC 17 determines whether the time measured by the second timer is within the predetermined time period. When the host PC 17 determines that the time measured by the second timer is not within the predetermined time period, the display unit 20 (FIG. 2) notifies that the abnormal situation has occurred in the same manner as above (S41), and the host PC 17 notifies, that the abnormal situation has occurred using the first luminaire 33 (S42). More specifically, the host PC 17 makes the first lighting lamp 35 (FIG. 2) of the first luminaire 33 blink to notify that the abnormal situation has occurred. At this time, the host PC 17 may turn on the first lighting lamp 35 in a lighting condition different from the normal lighting condition using at least one of color and luminance to notify that the abnormal situation has occurred.

Thus, the host PC 17 notifies that the abnormal situation has occurred, when both of the first reception tag 37 and the intermediate reception tag 43 do not receive the signal from the transmission tag 60 even if a predetermined time period has elapsed after the second lighting lamp 52 (FIG. 2) is turned on. Accordingly, when the user 70 stays in the private washroom 28 of the movement destination for a long time due to the occurrence of an abnormal situation, another person at a position far away from the private washroom 28 is aware of the first lighting lamp 35 (FIG. 2) in front of the rest room 26, thereby easily recognizing the occurrence of an abnormal situation. As a result, it is possible to easily respond to the occurrence of an abnormal situation, thereby making it possible to enhance the safety of the user 70. For example, another person can predict that the user 70 carrying the transmission tag 60 is in a difficult situation in the private washroom 28, and can respond promptly to the occurrence of an abnormal situation. Thus, the safety of the user 70 can be enhanced. The host PC 17 may notify that the abnormal situation has occurred, when no signal from the transmission tag 60 is received by the first reception tag 37 within a predetermined time period from the turning on of the second lighting lamp 52. Thus, another person can easily recognize that a person carrying the transmission tag 60 stays at a movement destination for a long time. The host PC 17 may notify that the abnormal situation has occurred, when no signal from the transmission tag has been received by both of the first reception tag 37 and the intermediate reception tag 43 within the predetermined time period from the turning on of the second lighting lamp 52.

In this case, the intermediate luminaire 41 and the second luminaire 51 are turned on, thereby improving the convenience when another person rushes to the rest room 26. At this time, when the first luminaire 33 arranged in front of the rest room 26 is turned on or made to blink in the corridor 15, a location to which another person should rush is clearly identified, and the person can easily respond promptly to the occurrence of an abnormal situation. Since the first luminaire 33 is turned on or made to blink even when a person not carrying the transmission tag 60 rushes to the rest room 26, the person can easily respond promptly to the occurrence of an abnormal situation.

Furthermore, the host PC 17 turns off the first lighting lamp 35 in response to the intermediate reception tag 43 having received the signal from the transmission tag 60, and is thereby capable of enhancing the user 70's feeling of safety and saving energy. Note that the host PC 17 may turn off the first lighting lamp 35 in response to the second reception tag 53 having received the signal from the transmission tag 60.

As described above, the intermediate luminaires 41 are arranged on the ceiling portion of the passage space 27 in the rest room 26, and the second luminaires 51 are arranged on the ceiling portions of the private washrooms 28, but one or plural second luminaires which are turned on at the same time may be arranged instead of the intermediate luminaires and the second luminaires. At this time, the host PC 17 turns on the first lighting lamp 35 in front of the rest room, and then turns on the second lighting lights of the second luminaires when the second reception tag receives the signal from the transmission tag 60. The host PC 17 notifies, using the first luminaire 33 in front of the rest room 26, that the abnormal situation has occurred, if the predetermined time period has elapsed following the turning on of the second lighting lamp because the user 70 stays in the rest room 26 and the first reception tag 37 in front of the rest room has not received the signal from the transmission tag 60. Thus, when the user 70 stays in the rest room for a long time, another person at a position far away from the rest room is aware of the turning on of the first lighting lamp 35 in front of the rest room, thereby easily recognizing the occurrence of an abnormal situation.

The host PC 17 may generate an alarm using an alarm unit (not illustrated) arranged in the control room 16 (FIG. 1) when the host PC 17 determines that the abnormal situation has occurred, instead of or along with notifying using the first lighting lamp 35 that the abnormal situation has occurred, to notify that the abnormal situation has occurred. The host PC 17 may generate the alarm using the alarm unit arranged in the control room 16 and display the information corresponding to the tag identification information of the transmission tag 60 received by the second reception tag on the display unit 20 arranged in the control room 16 when the host PC 17 determines that the abnormal situation has occurred, to notify that the abnormal situation has occurred. In this state, the signal transmitted from the transmission tag 60 to the second reception tag includes tag identification information stored in the transmission tag 60. According to this, a person in the control room 16 can easily identify the user 70 who stays for a long time.

The host PC 17 may generate the alarm using the alarm unit arranged in the control room 16 and display the installation location information of the second luminaire corresponding to the second reception tag having received the signal from the transmission tag 60 on the display unit 20 arranged in the control room 16, to notify that the abnormal situation has occurred. At this time, the host PC 17 may display, on the display unit 20, the user information of the user 70 carrying the transmission tag 60 which is the information received by the second reception tag. According to this, a person in the control room 16 can easily identify the user 70 who stays for a long time, and can easily recognize the location of the user 70.

The host PC 17 may be configured to set a notification necessity determination flag used to determine whether the occurrence of an abnormal situation should be notified based on the tag identification information transmitted from the transmission tag 60. According to this, the host PC 17 can identify only the user 70 which requires the notification about the occurrence of an abnormal situation to the person in the control room 16 according to the characteristics such as health conditions of the user 70 carrying the transmission tag 60, and notify that the abnormal situation has occurred when the user 70 stays in the rest room 26 for a long time.

At this time, the transmission tag 60 can transmit the user identification information of each of users 70, and the storage unit 19 (FIG. 2) included in the host PC 17 may be configured to store the classification information in which the users 70 are classified based on the user identification information. The host PC 17 may be configured to set the notification necessity determination flag based on the tag identification information and user identification information transmitted from the transmission tag 60, and the classification information. According to this, the host PC 17 can identify only the user 70 who requires the notification about the occurrence of an abnormal situation to the person in the control room 16 according to the characteristics of the user 70 carrying the transmission tag 60, and notify that the abnormal situation has occurred when the user 70 stays in the rest room 26 for a long time.

Figure 8:
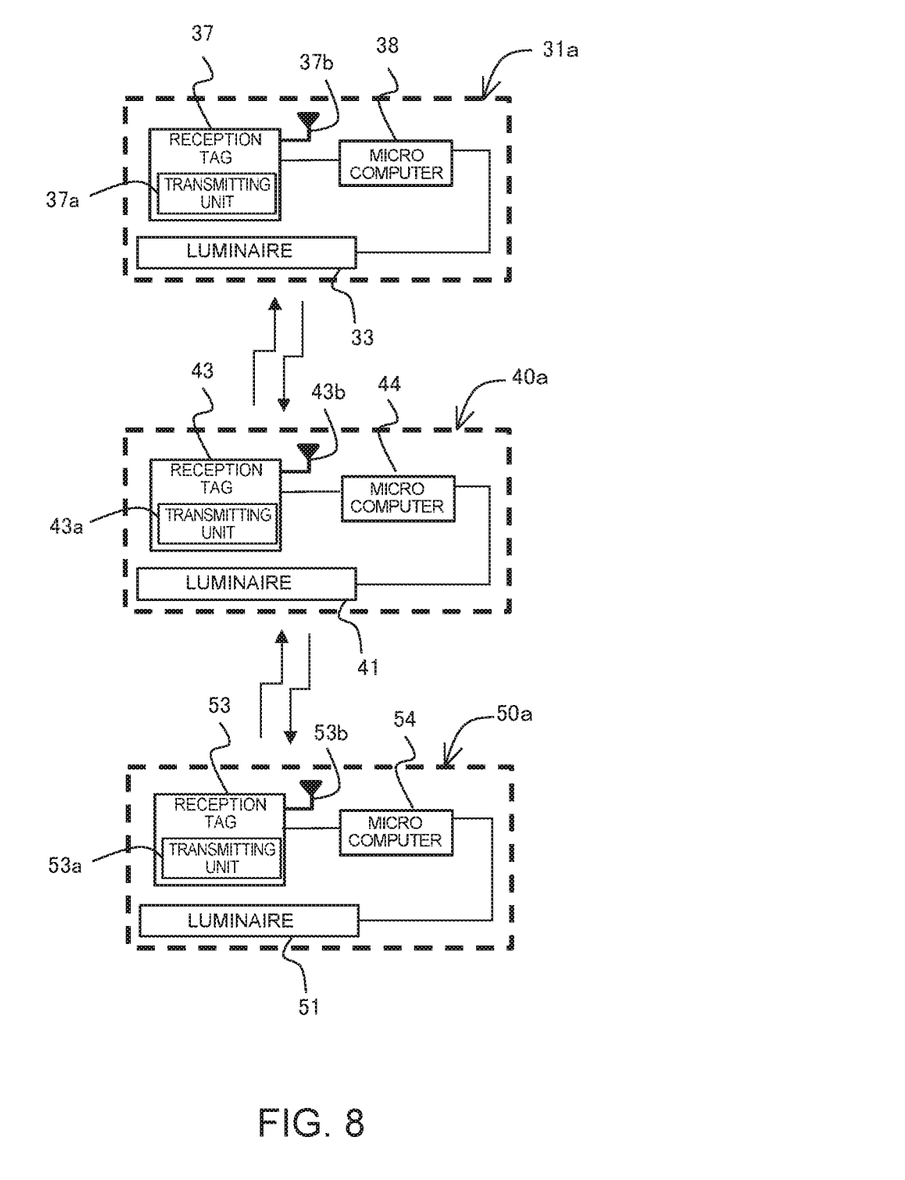
FIG. 8 is a configuration diagram illustrating a first lighting device in front of the rest room, and an intermediate lighting device, and a second lighting device which are included in a lighting system of another example of the embodiment.

FIG. 8 is a configuration diagram illustrating a first lighting device 31*a* in front of the rest room 26, and an intermediate lighting device 40*a*, and a second lighting device 50*a* which are included in a lighting system of another example of the embodiment. The lighting system of the present example illustrated in FIG. 8 is not provided with the host PC 17 (FIG. 2), unlike the configurations illustrated in FIG. 1 to FIG. 7. Alternatively, in the configuration of the present example, the first lighting device 31*a*, the intermediate lighting device 40*a*, and the second lighting device 50*a* include reception tags 37, 43, and 53, and microcomputers 38, 44, and 54 which are connected to the luminaires 33, 41, and 51, respectively. The controller is comprised of each of the microcomputers 38, 44, 54, respectively.

The plurality of microcomputers 38, 44, and 54 are wirelessly connected to one another so that signals can be mutually transmitted and received through transmitting units 37a, 43a, and 53a, and antennas 37b, 43b, and 53b which are included in the reception tags 37, 43, and 53, respectively. The configuration of such a controller is the same as a configuration in which the components of the host PC 17 are separated and wirelessly connected in the configurations illustrated in FIG. 1 to FIG. 7. The functions of the controller are the same as the functions of the host PC 17 in the configurations illustrated in FIG. 1 to FIG. 7. Other configurations and operations are the same as the configurations and operations of FIG. 1 to FIG. 7.

In the above-described configurations in the examples, the case where the reception tag is arranged on the ceiling portion has been described, but the reception tag may be arranged in a portion substantially directly under the corresponding luminaire on the floor surface or under the floor, so as to receive the signal from the transmission tag. The reception tag may be arranged in a portion located near the corresponding luminaire on the wall surface, so as to receive the signal from the transmission tag.

The case has been described where in the lighting system, the first luminaire is arranged on the ceiling portion in the corridor 15 in the nursing care facility, and the intermediate luminaire and the second luminaire are arranged in the rest room 26. On the other hand, the lighting system may be applied to a hospital instead of a nursing care facility, and a patient who is a user can carry the transmission tag 60. The lighting system may be applied to the facility having a warehouse or a safe, or a facility having a room with high confidentiality. For example, when a worker who is a user carrying the transmission tag 60 stays in a warehouse, a room with high confidentiality, or at a position near the safe for a long time, it is expected that the worker is likely to be undertaking abnormal actions. In this case, the administrator may desire to recognize the situation in which the abnormal situation may occur from a remote location. When the lighting system of the embodiment is applied to such facilities, the state of abnormal situation occurrence can be easily recognized from a remote location. A control facility may include plurality of lighting system each of those are described above.

The lighting system of at least one of the above-described configurations includes the first luminaire and the second luminaire, which are arranged in the illumination area, the controller which controls the first luminaire and the second luminaire, and the transmission tag, wherein the first luminaire includes the first lighting lamp, and is connected to the first receiver which receives the signal from the transmission tag through the controller, second luminaire includes the second lighting lamp and is connected to the second receiver which receives the signal from the transmission tag through the controller, and the controller turns on the first lighting lamp when the first receiver receives the signal from the transmission tag, then, turns on the second lighting lamp when the second receiver receives the signal from the transmission tag, and notifies that the abnormal situation has occurred when the first receiver has not received the signal from the transmission tag after the predetermined time period has elapsed following the turning on of the second lighting lamp.

The lighting system may include the intermediate luminaire which is arranged in the illumination area, wherein the controller may control the first luminaire, the second luminaire, and the intermediate luminaire, the intermediate luminaire includes the intermediate lighting lamp and is connected to the intermediate receiver which receives the signal from the transmission tag via the controller, and the controller may turn on the first lighting lamp when the first receiver receives the signal from the transmission tag, then, turns on the intermediate lighting lamp when the intermediate receiver receives the signal from the transmission tag, then, turns on the second lighting lamp when the second receiver receives the signal from the transmission tag, and notifies that an abnormal situation has occurred when both of the first receiver and the intermediate receiver have not received the signal from the transmission tag after the predetermined time period has elapsed following the turned-on of the second lighting lamp.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting system, comprising:
   a first luminaire and a second luminaire, which are arranged in an illumination area;
   a controller which controls the first luminaire and the second luminaire, and
   a transmission tag, wherein:
   the first luminaire includes a first lighting lamp and is connected to a first receiver which receives a signal from the transmission tag through the controller,
   the second luminaire includes a second lighting lamp and is connected to a second receiver which receives a signal from the transmission tag through the controller, and
   the controller turns on the first lighting lamp when the first receiver receives the signal from the transmission tag, then, turns on the second lighting lamp when the second receiver receives the signal from the transmission tag, and notifies that an abnormal situation has occurred when no signal from the transmission tag is received by the first receiver within a predetermined time period from the turning on of the second lighting lamp.

2. The lighting system according to claim 1, further comprising:
   an intermediate luminaire which is arranged in the illumination area, wherein:
   the controller controls the first luminaire, the second luminaire, and the intermediate luminaire,
   the intermediate luminaire includes an intermediate lighting lamp and is connected to an intermediate receiver which receives the signal from the transmission tag via the controller, and
   the controller turns on the first lighting lamp when the first receiver receives the signal from the transmission tag, then, turns on the intermediate lighting lamp when the intermediate receiver receives the signal from the transmission tag, then, turns on the second lighting lamp when the second receiver receives the signal from the transmission tag, and notifies that the abnormal situation has occurred when no signal from the transmission tag has been received by both of the first receiver and the intermediate receiver within the predetermined time period.

3. The lighting system according to claim 1, wherein
   when the controller determines that the abnormal situation has occurred, the controller turns on the first lighting lamp in a lighting condition different from a normal lighting condition using at least one of color and luminance, or makes the first lighting lamp blink, to notify that the abnormal situation has occurred.

4. The lighting system according to claim 2, wherein the controller turns off the first lighting lamp in response to the intermediate receiver or the second receiver having received the signal from the transmission tag.

5. The lighting system according to claim 1, wherein the signal transmitted from the transmission tag to the second receiver includes tag identification information, the controller is communicably connected to an alarm unit arranged in a control room, the alarm unit including a display,
when the controller determines that the abnormal situation has occurred, the controller causes the alarm unit to generates an alarm, and causes the display to display information corresponding to the tag identification information.

6. The lighting system according to claim 1, wherein the controller generates an alarm using an alarm unit arranged in a control room, and displays installation location information of the second luminaire and user information about a user carrying the transmission tag which is the information received by the second receiver on the display unit arranged in the control room, to notify that the abnormal situation has occurred.

7. The lighting system according to claim 1, wherein the signal from the transmission tag includes tag identification information stored in the transmission tag, and the controller sets a notification necessity determination flag used to determine whether occurrence of the abnormal situation should be notified based on the tag identification information transmitted from the transmission tag.

8. The lighting system according to claim 7, wherein the signal from the transmission tag includes user identification information of a user carrying the transmission tag,
the controller includes an operation processor which is connected to a storage unit,
the storage unit stores classification information in which users are classified based on the user identification information of each of the users, and
the controller sets the notification necessity determination flag based on the tag identification information and the user identification information which are transmitted from the transmission tag, and the classification information.

9. The lighting system according to claim 2, wherein the controller includes a first microcomputer, an intermediate microcomputer, and a second microcomputer,
the first luminaire is connected to the first receiver through the first microcomputer,
the intermediate luminaire is connected to the intermediate receiver through the intermediate microcomputer,
the second luminaire is connected to the second receiver through the second microcomputer,
each of the first receiver, the second receiver, and the third receiver includes a transmitter unit and an antenna, and
the first microcomputer, the intermediate microcomputer, and the second microcomputer are wirelessly connected to one another so that signals can be mutually transmitted and received through the transmitter and the antenna included in each of the first receiver, the second receiver, and the third receiver.

10. A control facility comprising:
a control room including an alarm unit having a display; and
one or more lighting systems, each which is the lighting system according to claim 1.

* * * * *